(12) United States Patent
Ripberger

(10) Patent No.: US 8,667,497 B2
(45) Date of Patent: *Mar. 4, 2014

(54) MANAGEMENT OF COPY SERVICES RELATIONSHIPS VIA POLICIES SPECIFIED ON RESOURCE GROUPS

(75) Inventor: Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,142

(22) Filed: Jun. 11, 2012

(65) Prior Publication Data

US 2012/0317581 A1  Dec. 13, 2012

Related U.S. Application Data

(63) Continuation of application No. 12/964,684, filed on Dec. 9, 2010.

(51) Int. Cl.
G06F 9/46 (2006.01)

(52) U.S. Cl.
USPC .......................................... 718/104

(58) Field of Classification Search
None
See application file for complete search history.

(56) References Cited

U.S. PATENT DOCUMENTS

| | | | |
|---|---|---|---|
| 5,765,154 A | 6/1998 | Horikiri et al. | |
| 5,905,245 A | 5/1999 | Tanaka | |
| 6,393,485 B1 | 5/2002 | Chao et al. | |
| 6,438,705 B1 | 8/2002 | Chao et al. | |
| 6,543,690 B2 | 4/2003 | Leydier et al. | |
| 7,228,351 B2 | 6/2007 | Arwe | |
| 7,340,646 B2 | 3/2008 | Haustein et al. | |
| 7,685,206 B1 * | 3/2010 | Mathew et al. | 707/785 |
| 2005/0114465 A1 * | 5/2005 | Coronado et al. | 709/214 |
| 2006/0069889 A1 | 3/2006 | Nagaya et al. | |
| 2007/0067366 A1 * | 3/2007 | Landis | 707/205 |
| 2008/0168473 A1 | 7/2008 | Armstrong et al. | |
| 2009/0292843 A1 | 11/2009 | Haban et al. | |
| 2010/0251252 A1 * | 9/2010 | Laverone et al. | 718/104 |

OTHER PUBLICATIONS

Stephen Chong et al., "Secure Web Applications via Automatic Partitioning," ACM 978-1-59593-591-5/07/0010, 2007, pp. 31-44.
Johnson Kin et al., "A Technique for QoS-based System Partitioning,"IEEE ISBN 0-7803-5974-7, 2000, pp. 241-246.
Carol Anderer et al., "Multimedia Magic: Moving Beyond Text," ACM 978-1-59593-634-09/07/0010, 2007, pp. 1-3.

(Continued)

Primary Examiner — Meng An
Assistant Examiner — James J Lee
(74) Attorney, Agent, or Firm — Griffiths & Seaton PLLC

(57) ABSTRACT

At least one additional resource group attribute is defined to specify at least one policy prescribing a copy services relationship between two of the storage resources. Pursuant to a request to establish the copy services relationship between the two storage resources, each of the two storage resources exchange resource group labels corresponding to which of the plurality of resource groups the two storage resources are assigned, and each of the two storage resources validates the requested copy services relationship and the resource group label of an opposing one of the two storage resources against the individual ones of the at least one additional resource group attribute in the resource group object to determine if the copy services relationship may proceed.

6 Claims, 6 Drawing Sheets

(56) References Cited

OTHER PUBLICATIONS

Marijn Janssen et al., "Issues in Relationship Management for Obtaining the Benefits of a Shared Service Center," ACM 1-58113-930-06/04/10, 2004, pp. 219-228.

Extron Electronics, "SW USB Series—Two and Four Input USB Switches," 2008, 4 pages.

"Home Digital Network Interface Specification With Copy Protection," The Society of Cable Telecommunications Engineers (SCTE), 2010, 33 pages.

U.S. Appl. No. 12/964,668, filed Dec. 9, 2010, entitled "Partitioning Management of System Resources Across Multiple Users".

U.S. Appl. No. 12/964,675, filed Dec. 9, 2010, entitled "Hierarchical Multi-Tenancy Management of System Resources in Resource Groups".

U.S. Appl. No. 12/964,699, filed Dec. 9, 2010, entitled "Management of Host Passthrough and Session Commands Using Resource Groups".

* cited by examiner

MANAGEMENT OF COPY SERVICES RELATIONSHIPS VIA POLICIES SPECIFIED ON RESOURCE GROUPS

CROSS-REFERENCE TO RELATED APPLICATIONS

This application is a Continuation of U.S. patent application Ser. No. 12/964,684, filed on Dec. 9, 2010.

BACKGROUND OF THE INVENTION

1. Field of the Invention

The present invention relates in general to computers, and more particularly to method embodiments for prescribing copy services relationships for storage resources organized into a plurality of resource groups in a computing storage environment.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed to provide storage for a number of host systems. Each host system provides one or more host logical partitions that are each capable of running an operating system that supports running one or more applications. Each host logical partition is allowed to access certain storage devices on the data storage subsystems. In this way, a general purpose computing environment allows the processing and storage resources of the configuration to be partitioned and assigned to various workloads associated with one or more applications. In some environments, a set of workloads may be associated with a specific tenant that is using a subset of the computing environment such that there may be multiple tenants that are concurrently running on various subsets within the environment. In this way, a general purpose multi-host system and multi-storage system computing environment can be configured to support multi-tenancy or multiple workloads.

In some situations, data storage is provided locally and also provided to a remote storage environment to enhance data reliability by providing redundancy. In these situations, several instances of data may be stored in multiple locations to provide for failsafe recovery. Storage environments such as network attached storage (NAS) and storage area networks (SAN) allow for these implementations, and for the implementation and maintenance of a larger amount of storage. SAN, NAS and similar systems are increasingly used for supplying a variety of services, such as email, database, applications, and other services. Data storage subsystems also are increasingly supporting the ability to perform outboard replication across SANs, LANs, and WANs to facilitate the replication of data for backup or mirroring purposes.

SUMMARY OF THE DESCRIBED EMBODIMENTS

Storage controllers often support a suite of replication services that allow copy of a volume to be created. The types of copies supported may vary by product, but may include such features as a point in time copy or a continuous copy, either of which may operate synchronously or asynchronously. The copy function is generally invoked by establishing a relationship between two or more volumes. The topology relationships between the two or more volumes may be linear (e.g., A->B->C->D . . . ) or may be branched (e.g., A->B & C).

In a generalized storage environment, specific volumes may be allocated for specific purposes. For example, a set of volumes on multiple storage subsystems may be utilized by a specific set of host systems as the host system's attached storage. Then additionally, this set of volumes may be copied to other sets of volumes for either backup (point in time copy) or disaster recovery (continuous copy). In establishing the relationships for the copy functions, it is necessary that the user copy the correct source volume to the correct target volume. Since copy functions generally support copying any source volume to any target volume within the set of storage subsystems at one or more installations, there are typically no constraints in the environment to prevent a copy request from targeting an incorrect volume as its target. When this occurs such that the erroneous target volume is actually a volume that is actively being used to store data for some purpose other than the copy of the source volume, the data on the target volume can be inadvertently overwritten. This generally causes loss of the data on that volume and may cause outages to the systems requiring access to the active volume. In a multi-tenancy environment, the copying of an erroneous volume may constitute a security breach such that one tenant may obtain access to data that belongs to another tenant.

A general mechanism is desirable to allow for policing of copy relationships such that specific copy relationships are limited to a specific set of volumes. Current mechanisms designate a particular volume as a potential copy target using a flag. While these mechanisms may prevent a particular source volume from being overwritten, they do not limit the incorrect targeting of a source volume to the wrong target volume or the targeting of the wrong source volume to a target volume. A more general-purpose mechanism to assist a system administrator to prevent the incorrect targeting of copy services relationships is desired.

Accordingly, and in view of the foregoing, various method embodiments for prescribing copy services relationships for storage resources organized into a plurality of resource groups in a computing storage environment are provided. A resource group is a collection of resources (e.g. volumes, etc.) that has a resource group label that uniquely identifies the resource group and additionally can be assigned a set of policies via the resource group attributes. In one embodiment, an additional resource group attribute is defined to specify one or more policies prescribing a copy services relationship between two storage resources. Pursuant to a request to establish the copy services relationship between the two storage resources, each of the two storage resources exchange resource group labels corresponding to which of the plurality of resource groups the two storage resources are assigned, and each of the two storage resources validate that the policies in their associated resource group allow the copy services relationship to be performed. In one embodiment, one or more of the resource group attributes used to manage copy services relationship policies contain a resource scope that is used to validate the resource group label of the opposing storage resource in the copy relationship. The resource scope specifies a pattern that can be compared to a resource group label to detect whether the pattern matches the label. Each storage resource compares the resource group label of the opposing storage resource to the resource scope in the at least one additional resource group attribute in the resource group object to determine if the copy services relationship may proceed. If either storage resource determines that the copy services relationship is not allowed, the request to form the copy services relationship is rejected. In other words, prescribing copy services relationships for storage resources organized into several resource groups with each of the storage resources having a resource group attribute associating a given storage resource object with one of the many resource groups and associating the policies in one of the several resource groups with a storage resource.

In another embodiment, the mechanisms of the illustrated embodiments may include prescribing copy services relationships for storage resources in a computing environment by organizing the storage resources into a number of resource groups in a computing storage environment with each of the storage resources having a resource group attribute associating a storage resource object with the plurality of resource groups and associating at least one policy in the plurality of resource groups with the storage resources and defining at least one additional resource group attribute to specify a policy prescribing the copy services relationships between the storage resources associated with the resource group. The policy prescribing the copy services relationships utilizes the resource group label attribute of the resource group to identify the resource group within a storage subsystem. The resource group label attribute is used in conjunction with a resource scope attribute in one of the resource groups. The resource scope attribute defining a pattern to be compared to each of a set of the resource group label such that the resource group labels may be determined to perform one of either matching or not matching the resource scope pattern. The resource group label is based on a matching pattern which considers the resource groups to be included within the scope of the resource scope attribute for the purposes of making a policy decision to perform one of allowing and disallowing copy services operations. The copy services relationships between the storage resources associated with the resource group and the storage resources that is the partner of the copy services relationship and two of the storage resources are assigned at least one of an additional resource group attribute in a manner dependent on a copy services request, wherein pursuant to a request to establish the copy services relationship between the two storage resources: each of the two storage resources exchange a resource group label corresponding to which of the plurality of resource groups the two storage resources are assigned, and each of the two storage resources validate the copy services relationship request, and the resource group labels of the opposing storage resources against the at least one additional resource group attribute define a copy relationship policy in the storage resources associated with the resource group to determine if the copy services relationships may proceed.

In another embodiment, the mechanisms of the illustrated embodiments may include prescribing copy services relationships for storage resources in a computing environment by organizing the storage resources into a number of resource groups in a computing storage environment with each of the storage resources having a resource group attribute associating a storage resource object with the plurality of resource groups and by additionally assigning a user resource scope to each user ID that has the authority to issue a copy services request through a management interface. Pursuant to a request to establish the copy services relationship between two storage resources, the resource group label of the resource group associated with the storage resource that is the source of the copy relationship is compared to the user resource scope of the user ID making the request. In the event that the resource group label does not match the user resource scope, the copy services request is rejected. Thus a given users ability to request copy services operations is limited to the set of storage resources that are assigned to resource groups that are within the scope of the user's user resource scope.

In addition to the foregoing exemplary embodiment, various other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments provide mechanisms for prescribing copy services relationships between a variety of computing storage resources (possibly spread between multiple interconnected storage subsystems, for example) managed by multiple users, in a multi-tenancy environment. Pursuant to these mechanisms, exemplary embodiments are described that operate to associate users of the computing storage environment's configuration with a user resource scope attribute expanded to prescribe copy services relationships between a particular user and the storage resources. The user is allowed to request copy services operations for, and assign to, objects in the system configuration and a resource group attribute expanded to add policy constraints governing particular copy services relationships, as will be further illustrated.

Figure 1:
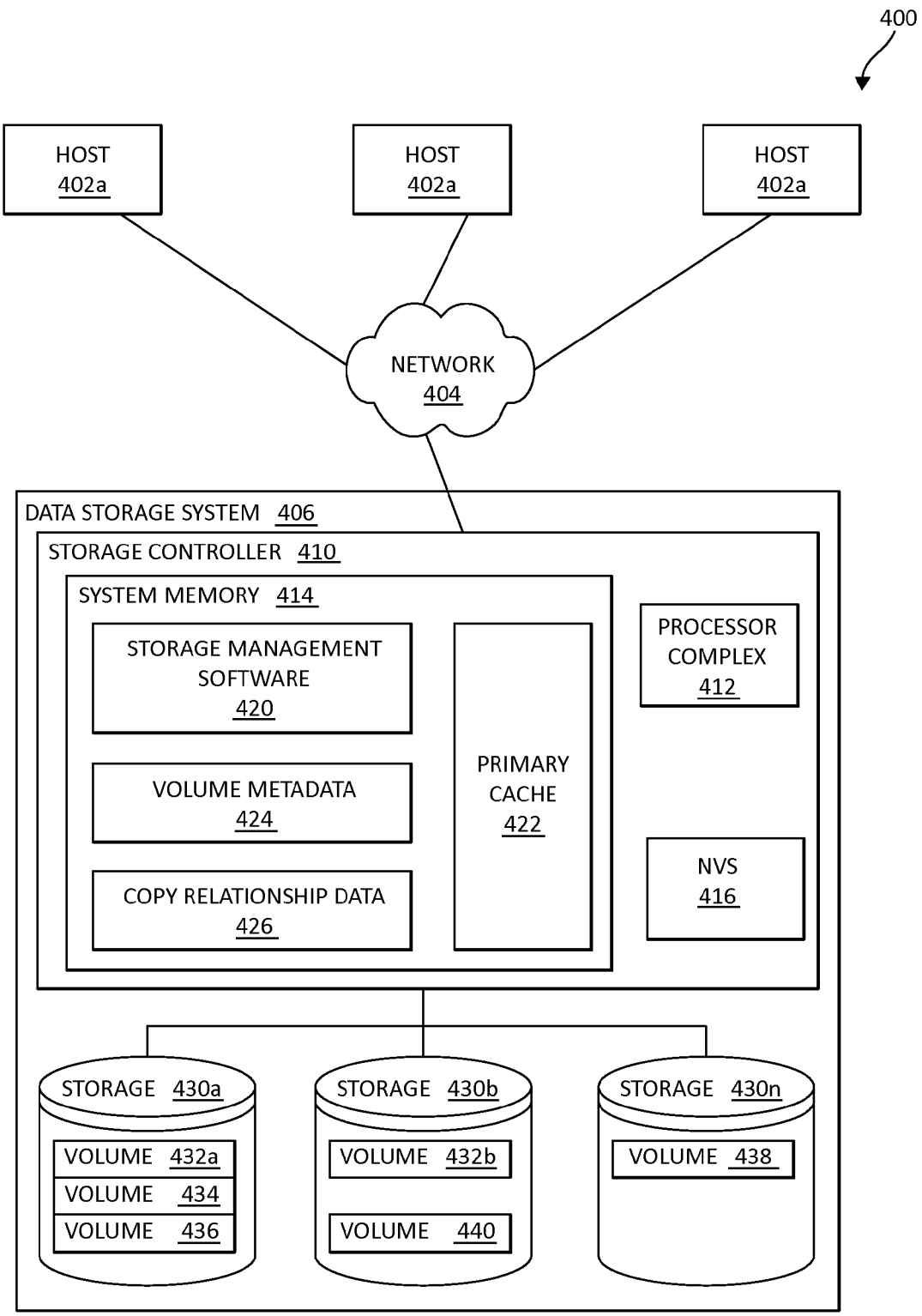
FIG. 1 is a block diagram illustrating a portion of an exemplary computing storage environment.

In reference to FIG. 1, one exemplary embodiment 400 of a computing environment including a data storage system 406 is illustrated in block diagram form and represents an exemplary computing environment for implementing the methods described herein. A network 404 connects one or more hosts 402 with a data storage system 406. Data storage system 406 receives input/output requests for writing/reading data from hosts 402, also referred to herein as a "write request" and "read request," and thereby serves as a networked storage resource for hosts 402. In one embodiment, data storage system 406 is implemented as IBM® System StorageTM DS8000™ (trademark of International Business Machines, Corp. or "IBM"). Network 404 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. Hosts 402 may be local or distributed among one or more locations and may be equipped with any type of fabric or network adapter (not shown in FIG. 1) to network 404, such as Fibre channel, FICON, ESCON, Ethernet, fiber optic, wireless, or coaxial adapters. Data storage system 406 is accordingly equipped with a suitable fabric or network adapter (not shown in FIG. 1) to communicate via network 404. Data storage system 406 is depicted in FIG. 1 comprising storage controller 410 and storage 430.

To facilitate a clearer understanding of the methods described herein, storage controller 410 is shown in FIG. 1 as a single processing unit, including processor complex 412, system memory 414 and nonvolatile storage ("NVS") 416, which will be described in more detail below. It is noted that in some embodiments, storage controller 410 is comprised of multiple processing units, each with their own processor complex and system memory, and interconnected by a dedicated network within data storage system 406. Storage 430 may be comprised of one or more storage devices, such as storage arrays, which are connected to storage controller 410 by a storage network.

In some embodiments, the devices included in storage 430 are connected in a loop architecture. Storage controller 410 manages storage 430 and facilitates the processing of write and read requests intended for storage 430. The system memory 414 of storage controller 410 stores program instructions and data which processor complex 412 may access for executing functions and method steps associated with managing storage 430. In one embodiment, system memory 414 includes storage management software 420 for executing storage management functions, including the methods and operations described herein. In some embodiments, system memory 414 is allocated for storing volume metadata 424 and copy relationship data 426, which are used for implementing certain virtualization mechanisms, described further below. As shown in FIG. 1, system memory 414 may also include a primary cache 422 for storage 430, also referred to herein as a "cache memory", for buffering "write data" and "read data", which respectively refer to write/read requests and their associated data. In one embodiment, primary cache 422 is allocated in a device external to system memory 414, yet remains accessible by processor complex 412 and serves to provide additional security against data loss, as will be described in detail with respect to FIG. 2 below.

In some embodiments, primary cache 422 is implemented with a volatile memory and coupled to processor complex 412 via a local bus (not shown in FIG. 1) for enhanced performance of data storage system 406. The NVS 416 included in data storage controller is accessible by processor complex 412 and serves to provide additional security against data loss, as will be described in detail with respect to FIG. 2 below. NVS 416, also referred to as a "persistent" cache, or "cache memory", is implemented with nonvolatile memory that may or may not utilize external power to retain data stored therein. In some embodiments, a backup power source (not shown in FIG. 1), such a battery, supplies NVS 416 with sufficient power to retain the data stored therein in case of power loss to data storage system 406. In certain embodiments, the capacity of NVS 416 is less than the total capacity of primary cache 422.

Storage 430 may be physically comprised of one or more storage devices, such as storage arrays. A storage array is a logical grouping of individual storage devices, such as a hard disk. In certain embodiments, storage 430 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

As shown in FIG. 1, a logical volume, or simply "volume," may have different kinds of allocations. Storage 430a, 430b and 430n are shown as ranks in data storage system 406, and are referred to herein as rank 430a, 430b and 430n. Ranks may be local to data storage system 406, or may be located at a physically remote location. In other words, a local storage controller may connect with a remote storage controller and manage storage at the remote location. Rank 430a is shown configured with two entire volumes, 434 and 436, as well as one partial volume 432a. Rank 430b is shown with another partial volume 432b. Thus volume 432 is allocated across ranks 430a and 430b. Rank 430n is shown as being fully allocated to volume 438—that is, rank 430n refers to the entire physical storage for volume 438. From the above examples, it will be appreciated that a rank may be configured to include one or more partial and/or entire volumes. Volumes and ranks may further be divided into so-called "tracks," which represent a fixed block of storage. A track is therefore associated with a given volume and a given rank.

As mentioned previously, one kind of virtualization mechanism that may be implemented on data storage system 406 is a copy relationship. In a copy relationship, data on one rank may be automatically copied to another rank so that access to data volumes can be provided from two different sources. In one embodiment, a copy relationship involves a physical point-in-time copy operation, in which all the data from source volumes to target volumes are physically copied so that the target volume has a copy of the data as of a point-in-time. In some embodiments, a copy relationship involves a logical point-in-time copy operation, in which a logical copy of the source volume is made, after which data are only copied over when necessary. The logical copy relationship provides the advantageous effect of deferring the physical copying, and is performed to minimize the time during which the target and source volumes are inaccessible. One example of a copy relationship is known as FlashCopy® (FlashCopy is a registered trademark of International Business Machines, Corp. or "IBM"). FlashCopy® involves establishing a logical point-in-time relationship between source and target volumes on different ranks Once the copy relationship is established, hosts may then have immediate access to data on the source and target volumes, and the data may be copied as part of a background operation. Any new modification of data to tracks on the source rank cause those modified tracks on the source rank to be written to the target rank. Reads to any tracks in the cache that have not been updated with modified data from the source causes the source track to be staged to the cache before access is provided to the track from the cache. It is noted that write data associated with or transferred as a result of a copy relationship are referred to herein as being "involved" in a copy relationship. Information about the logical tracks of a copy relationship are stored in volume metadata 424.

Figure 2:
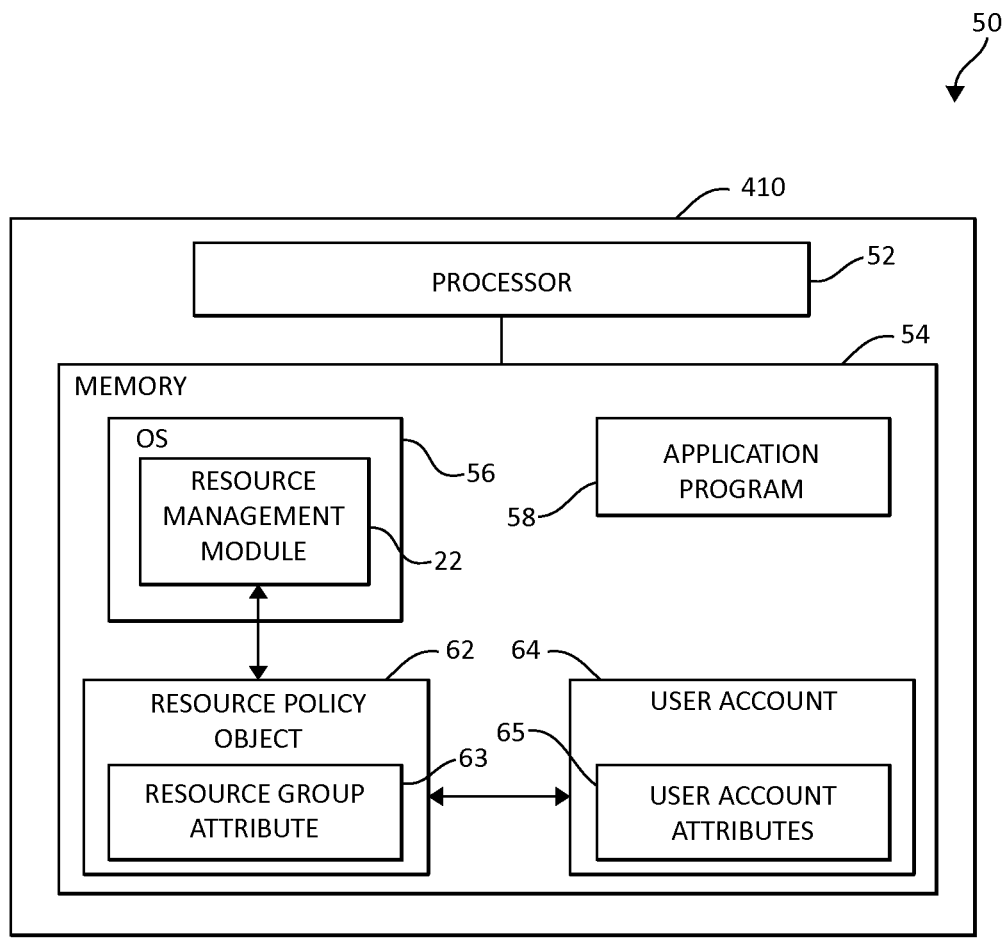
FIG. 2 is a block diagram illustrating an exemplary portion of a storage node involved with resource group management of the exemplary computing storage environment depicted in FIG. 1.

Turning now to FIG. 2, an exemplary portion 50 of storage controller 410 as also seen in FIG. 1, previously, is illustrated. Portion 50 of storage controller 410 is operable in a computer environment as a portion thereof, in which mechanisms of the following illustrated embodiments may be implemented. It should be appreciated, however, that FIG. 2 is only exemplary and is not intended to state or imply any limitation as to the particular architectures in which the exemplary aspects of the various embodiments may be implemented. Many modifications to the architecture depicted in FIG. 2 may be made without departing from the scope and spirit of the following description and claimed subject matter.

In the illustrated embodiment, storage controller 410 includes a processor 52 and a memory 54, such as random access memory (RAM). The storage controller 410 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the storage controller 410.

In the illustrated embodiment, the storage controller 410 operates under control of an operating system (OS) 56 (e.g. AIX, z/OS, OS/2, LINUX, UNIX, WINDOWS, MAC OS) stored in the memory 54, and interfaces with the user to accept inputs and commands and to present results. In one embodiment of the present invention, the OS 56 facilitates management partitioning functionality according to the present invention. To this end, OS 56 includes a resource management module 22 as previously described, which may be adapted for carrying out various processes and mechanisms in the exemplary methods described following.

The Resource Manager is the 'application' of interest here and it is compiled by the manufacturer before it is put on the machine. The resource management module program may be written in a programming language such as COBOL, PL/1, C, C++, JAVA, ADA, BASIC, VISUAL BASIC, ASSEMBLER, on any other programming language to be translated into code that is executable by the processor 52. In one embodiment, the functionality of the Resource management module may be located in the storage controller nodes rather than the management node.

Data structures 62 and 64 (resource group object 62, and user account object 64, respectively) are shown interactional with the resource management module 22 in memory 54. Data structure 62 includes one or more resource group attributes 63 (such as a resource group number, a resource group label, and other resource group policy attributes as will be further described). Data structure 64 includes one or more user account attributes 65 (such as a user identification (ID), password, and a user resource scope (URS) as will be further described). A portion of the functionality of the resource management module 22 is, in one embodiment, to correlate the data structures 62 assigned to a particular storage resource(s), including resource group attributes 63 previously described, and data structures 64 assigned to a particular user account object, including the user account attributes 65 as previously described.

To further implement and execute mechanisms and processes according to the present invention, OS 56, in conjunction with the resource management module 22, memory 54, processor 52, data structures 62 and 64, and other computer processing, networking, and storage components, may implement management partitioning mechanisms according to the present invention as will be further described. As one of ordinary skill in the art will appreciate, the mechanisms implemented by resource management module 22 as presently illustrated may be implemented in various forms and architectures. Accordingly, the illustration of resource management module 22 (as well as data structures 62 and 64) in the present figure is again intended to demonstrate logical relationships between possible computing components in the 410, and not to imply a specific physical structure or relationship.

In one embodiment, instructions implementing the operating system 56, and the resource management module 22 are tangibly embodied in a computer-readable medium, which may include one or more fixed or removable data storage devices, such as a zip drive, disk, hard drive, DVD/CD-ROM, digital tape, solid state drives (SSDs), etc. Further, the operating system 56 and the resource management module comprise instructions which, when read and executed by the computing storage environment to perform the steps necessary to implement and/or use the present invention. Resource management module and/or operating system 56 instructions may also be tangibly embodied in the memory 54 and/or transmitted through or accessed by networks attached to the storage controller (not shown) via various components. As such, the terms "article of manufacture," "program storage device" and "computer program product" as may be used herein are intended to encompass a computer program accessible and/or operable from any computer readable device or media.

Embodiments of the present invention may include one or more associated software application programs 58 that include, for example, functions for managing a distributed computer system comprising a network of computing devices, such as a SAN or NAS as previously described. Accordingly, processor 52 may comprise one or more storage management processors (SMP). The program 58 may operate within a single computer and/or 410 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those of ordinary skill in the art. As one of ordinary skill in the art will appreciate, the management node portion 50 may comprise computing components visible throughout the distributed computer system, such as components conforming to a lightweight directory access protocol (LDAP). In this manner, the data structure 64 may be listed in an LDAP server, for example.

The portion 50 may, in one embodiment, be adapted to define user accounts (having data such as the aforementioned user ID, password, user resource scope), and provides a mechanism for the system administrator to assign a particular user resource scope to the user account. The functionality of the resource group and user resource scope attribute in relation to the present invention and claimed subject matter will now be further described in more detail.

Each storage resource may be associated with a resource group object. Each storage resource that can be associated with a resource group has a resource group attribute that contains the resource group number of its associated resource group. The resource group object may have other attributes that define policies relative to how the resources in the resource group can be managed. The resource group object, in turn, may have a resource group label attribute that contains a unique identifier for the resource group within the storage controller that is compared to a given resource scope attributes to determine if the resource group is within a the scope specified by the resource scope attribute. The user account information (such as the user ID, for example), in turn, may have a user resource scope attribute that contains a resource scope that can be used to test whether the user has access to a given resource group. The resource scope may be implemented with a similar semantic structure as a resource group label, except that it may contain "wildcard" characters allowing the resource scope to specify a specific subset of the full set of resource groups.

While the following exemplary embodiment of a resource scope and resource group implementation incorporates the text string previously mentioned, it will be apparent to one of ordinary skill in the art that the semantic structure of the string (or a different implementation entirely) is possible. In this exemplary embodiment, the slash and the period are used as delimiters. The asterisk(*) is used as a "wild card." A token is defined as at least a portion of the text string that may contain any printable characters other than delimiters or the asterisk (*).

In the embodiment A, a resource group label is a text string including one or more parts separated by a slash delimiter. Each part is referred to as a resource group qualifier. The resource group qualifier may be null or consist of one or more tokens separated by a period. At least one resource group qualifier must be non-null. Consider the following examples of resource group labels:

| /vol | A.B.C/vol1 |
| a123/vol1 | A1.B2.test/C.d.vol |

Again referring to exemplary embodiment A, a resource scope is a text string consisting of one or more parts separated by a slash delimiter. Each part is referred to as a resource scope qualifier. The resource scope qualifier may be null or consist of one or more tokens separated by a period. In addition the last character of the last token of any resource scope qualifier may be an asterisk (*). Consider the following examples of resource scope strings:

| * | /* | */* | a*/v* | A1.B2.te*/C.d.vol |
| A1.B2.text/C.d* | A*/C* | a123/vol1 | a123/vol1 |
| A.B.C/vol1 | A1.B2.test/C.d.vol |

A resource scope is said to match a resource group label if each resource scope qualifier matches each resource group qualifier. A resource scope qualifier matches a resource group qualifier if they are the same string or if the all characters from the beginning of the string up to the character preceding the * in the resource scope qualifier are the same. Thus for example, a resource scope of A*/B* would match any of the following resource group labels: A/B, A1/B, A123/B, A/B1, A.abc/B.def.

The following illustrated embodiments, as previously described, expand the attributes associated with the resource group object to specify policies relative to what copy services relationships may be formed between storage resources, such as volumes. In an embodiment concerning storage volumes, for example, when a request is made to establish a copy service relationship, the two volumes to be involved in the relationship exchange the resource group labels from their associated resource groups. They then check the resource group labels of their copy partner against the policy attributes in their resource group object to verify that they are allowed to participate with this partner. Accordingly, for two volumes A and B forming a relationship, Volume A checks that volume B's resource group label is allowed by the policies in volume A's resource group, and Volume B checks that Volume A's resource group label is allowed by the policies in Volume B's resource group. If both volumes determine that they are allowed to be in a relationship, the relationship is accepted. The resource group policy attributes may be set to control the copy services relationships that are allowed to be formed between a pair of volumes. To provide overall control copy services relationships, further consider who is allowed to request a copy services relationship on a given volume. In a multi-tenancy environment, not only is it necessary to prevent an invalid relationship from being requested, but it is necessary to further limit which volumes a given tenant is allowed to make requests for. For instance, it would not be acceptable to have tenant A make a request to form a valid copy relationship between two of tenant B's storage resources. Even when there is only a single tenant that owns the entire computing environment, it is possible to partition the environment between the various workloads to prevent accidents by operators that might create an invalid relationship or a valid relationship that the specific operator is not authorized to create. A copy request may be requested through a host I/O interface over the SAN or though a network management interface by a network user.

Furthermore, pursuant to other embodiments of the present invention, the set of user accounts (e.g., user IDs) that can initiate a copy services relationship may be limited by requiring that the user ID have authority to manage the source/primary volume of the relationship via the user resource scope of his user ID, for example. In this case, the user resource scope must match the resource group label of the source volume that the user is making the request to, or the copy request will be rejected. In addition, the set of volumes that a host system partition can initiate a copy services relationship to may be limited by requiring that the host/client have access to communicate with the source/primary volume via the configuration of the storage subsystem in the case of an open host using SCSI Fibre channel attachment or via the configuration of the host system partition in the case of an IBM zSeries host system using FICON fibre channel or ESCON channel attachments. Since the users/hosts are limited to primary/source volumes they have access to, and since the relationships that can be formed between source/primary and target/secondary volumes in a copy services relationship is limited to only relationships allowed by the resource group policy, users/hosts are limited to the primary/source volumes they have authority to manage, and the copy relationships formed by any volume is limited to the relationships allowed by the resource group policies.

According to aspects of the illustrated embodiments, the policies in the resource group for copy services may be specified using a resource scope to identify a set of resource groups that are allowed to be in the relationship with a particular group. Although a number of variations of controls may be used to specify the copy policies as one of ordinary skill in the art will appreciate, the following are representative of the type of controls that may be specified in attributes of the resource group to specify the copy policies. For all replication services, a single global resource scope attribute may be supported that applies to both the source scope and target scope of any relationship of a volume in the resource group. A source resource scope attribute is applied by a target volume against the resource group label of a prospective source volume to determine if the relationship is allowed. A target resource scope attribute is applied by a source volume against the resource group label of a prospective target volume to determine if the relationship is allowed. For each replication service, a source resource scope attribute and a target resource scope attribute may also be supported. For each type of host attachment or network attachment (e.g. SCSI, FICON, ESCON, Network User), a control may be supported to enable or disable copy services operations through a given attachment.

Pursuant to these attributes, in one exemplary embodiment, the following characteristics may be associated. First, a null value in the resource scope selects no resource groups and therefore indicates that there are no relationships allowed. An * value in the resource scope allows any resource group which says that any relationship is allowed. Any other resource scope limits the relationship to the resources specified by the resource scope. For instance, if the source scope is null, and the target scope is set to "A/vol," then volumes in this resource group cannot be the target of this relationship type because they do not allow any sources, but they can be the source of a copy relationship that has a target volume in a resource group "A/vol."

As one of ordinary skill in the art will appreciate, a variety of copy services relationship types may each include a set of the aforementioned attributes. These relationship types may include count key data (CKD) or fixed block (FB) relationship types, continuous copy (PPRC) or point-in-time copy (FC) types, synchronous or asynchronous relationship types, full volumes or datasets types, or any permutation of these types. One embodiment of a storage subsystem which may implement aspects of the present invention has up to 64K logical volumes (which might be fixed block or CKD in nature). The address of a logical volume "ABCD"x is specified by a 2 byte logical subsystem (LSS) number ('AB)'x and a 2 byte device address number ('CD'x).

In one exemplary embodiment, the following global controls may be implemented pursuant to the resource scope attributes previously described. For example, depending on the copy relationship under consideration, certain requirements may be implemented. These may include CKD PPRC Source/Target Device Address Matching (for two volumes V1 and V2 in a PPRC relationship, V1's device address must match V2's device address), CKD PPRC Source/Target LSS Address Matching (for two volumes V1 and V2 in a PPRC relationship, V1's LSS must match V2's LSS), FB PPRC Source/Target Device Address Matching, and FB PPRC Source/Target LSS Address Matching. For users who form relationships between a primary and secondary subsystem where, for example, logical volume '0000'x on the primary subsystem copies to '0000'X on the secondary subsystem, the above controls may be used to ensure that relationships between devices with unmatched addresses cannot be formed even though the volumes are all aggregated into two groups.

To handle introduction of resource group capability, a default resource group (e.g., Rg0 with RGL="PUBLIC") may be implemented to which all existing resources are assigned. In one embodiment, the default settings in the default resource group would allow any source in RG0 (src scope=PUBLIC) and any target in RG0 (tgt scope=PUBLIC). Additionally, existing user accounts would default non-administrators to URS=PUBLIC and administrator accounts to URS=*. If the copy controls are introduced subsequent to code supporting resource groups, the set of the policy attributes in any existing resource groups may also be defaulted to values that would not create errors for existing relationships (e.g. src scope=*, tgt scope=*). Users with authority to modify the resource groups may subsequently create new resource groups, reassign storage resources between resource groups, and modify the policy attributes as desired to create the desired relationship policies. It should be noted that the desire to aggregate volumes by their allowed copy relationships tends to require the ability to create the resource groups along these lines.

In view of the foregoing, consider the following example. A user may be given access to all volumes in the resource scope 'A/vols*', which is say all the volumes attached to a given set of host systems (both primary and secondary sites). It might be then desirable to divide those volumes into groups related to their sites (e.g., S1 and S2) as in A/vols.S1 and A./vols.S2, and then further divide those volumes into resource groups that reflects their allowed relationships as follows:

| | |
|---|---|
| A/vols.S1.N | Not mirrored across sites (no PPRC relationships) |
| A/vols.S1.MM | Synchronous mirrored across sites |
| A/vols.S1.GM | Asynchronous mirrored across sits |
| A/vols.S1.BK | Point in time copy backup volumes |
| A/vols.S1.GMT | Point in time targets for asynchronous tertiaries |

Similar volume groups may be divided at the secondary site. With an appropriate set of policies configured each resource group, the ".N' resource group polices would only allow point in time copies to the local site's .BK volumes to allow backup. The synchronous mirrored resource groups may be set up so that S1.MM could PPRC to S2.MM and S2.MM could PPRC to S1.MM (allowing sites to failover and failback) and also allow S1.MM to point in time copy to S1.BK and S2.MM to point in time copy to S2.BK to allow local site backup. The S1.GM resource group may be configured to allow PPRC from S1.GM to S2.GM as well as S1.GM point in time copy to S1.BK for backup purposes. The S2.GM resource group allows PPRC from S1.GM and allows point in time copy to S2/GMS to form the A→B→C relationship needed for an asynchronous mirror across the A, B, and C volumes. Finally, the S1.BK group may be configured to allow point in time copy sources from and targets to any resource group.

Figure 3:
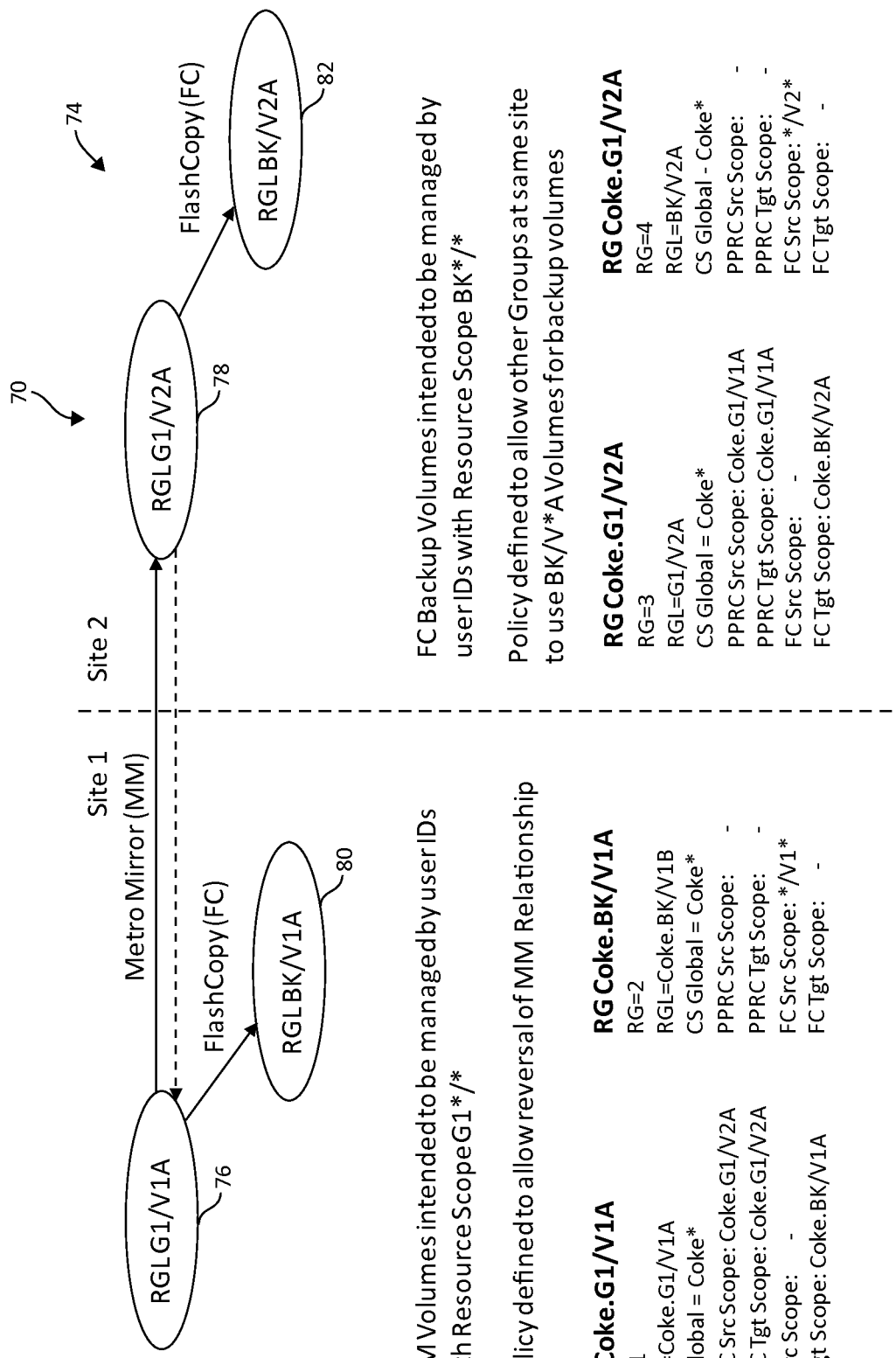
FIG. 3 is a flow diagram of exemplary replication relation management according to one embodiment of the present invention.
Figure 4:
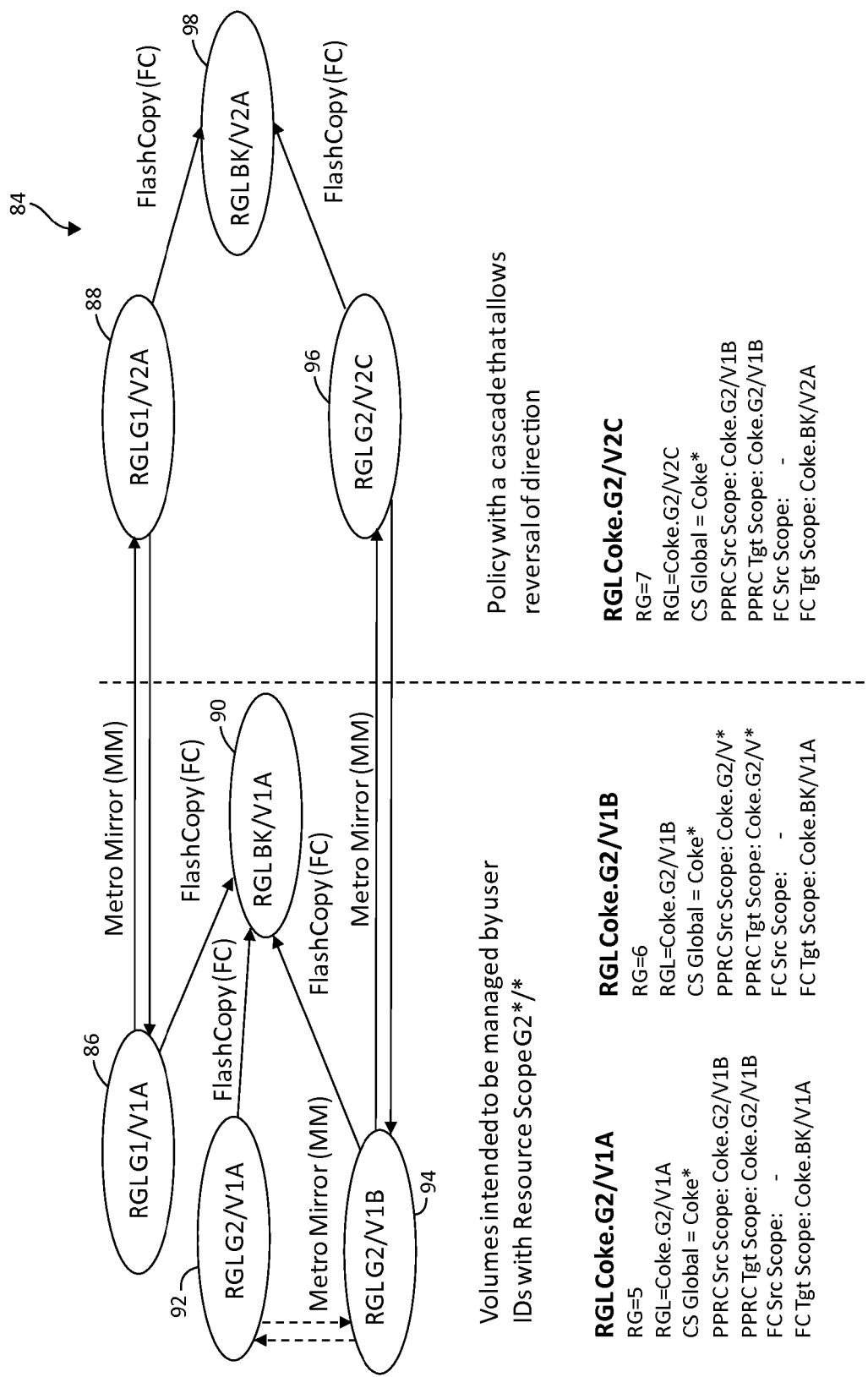
FIG. 4 is an additional flow diagram continuing the exemplary replication relation management first depicted in FIG. 3.

Turning now to FIGS. 3 and 4, flow diagrams of exemplary replication relation management according to aspects of the illustrated embodiments are depicted. Metro Mirror® refers to an exemplary real-time synchronous mirroring mechanism, and FlashCopy® refers to an exemplary point-in-time copy mechanism, both owned by IBM® corporation. Metro-mirror uses a function called Peer-to-Peer-Remote-Copy (PPRC) to implement the copy operation. Various copy services relationships are established between storage resources either co-located or at a remote site as will be further described.

Turning first to FIG. 3, resource group 76 and resource group 80 are depicted with resource group labels (RGLs) Coke.G1/V1A and Coke.BK/V1A as shown. Similarly, site two 70 houses resource group 78 and 82, again with resource group labels (RGLs) Coke.G1/V2A and Coke.BK/V2A as shown. For each delineated resource group shown for each site 70 are policy attributes for implementation of synchronous mirroring and/or point-in-time backup mechanisms. For example, resource group Coke.G1/V1A is defined with Copy Services Global Scope set to Coke* such that this attribute requires that any copy services relationships that involves volumes in this resource group must be with a volume that is also in a resource group whose RGL starts with Coke. Further, in one embodiment, the implementation enforces that any other copy services policy attributes must be subordinate to the CS Global attribute. A subordinate resource specified a scope that is totally contained within the scope of the superior resource scope (e.g. for CS Global Scope=Coke*, a subordinate scope could be Coke, Coke.1, Coke.1.2, etc.). The CS Global scope is a convenient attribute to limit the scope of a given tenant to a given scope such that any copy services relationships for that tenant must be within that resource scope. This resource group also has the PPRC source and target scope attributes set to G1/V2A, allowing for a synchronous mirroring relationship in either direction between resource groups 76 and 78 (as denoted by the dashed arrows for the reverse direction). This resource group also has the FC source scope set to null which prevents any other volume from treating a volume in this resource group as FlashCopy target and a FC target scope that allows its volumes to act as a FlashCopy source for volumes in resource group BK/V1A.

Resource group RGL G1/V1A is defined with the FlashCopy source scope attribute set to */V1* allowing for other resource groups at the same site to use BK/V1A volumes for point-in-time backup volumes (such as between volumes associated between resource groups 76 and 80). The resource group attributes for the resource groups 87 and 82 at site two 70 are equivalent to those at site one 72 and support the allowed relationships as shown in FIG. 3.

Synchronous mirroring volumes intended to be managed by user accounts with user resource scope attribute G1*/* are defined, as well as point-in-time backup volumes intended to be managed by user accounts with user resource scope attribute BK*/* as shown.

Turning now to FIG. 4, sites 72 and 74 are again seen, here now with the addition of further copy relationships defined between resource groups 90, 92, 94, and 96. As is shown, volumes affiliated with resource groups 92 and 94 are established with point-in-time relationships with volumes affiliated with resource group 80. Volumes affiliated with resource group 92 are established with a synchronous mirroring relationship between volumes affiliated with resource group 94. Additionally volumes in resource group 94 are established with a synchronous mirroring relationship between volumes affiliated with resource group 96. As such, the volumes in resource group 94 are said to be in a cascaded relationship where they are the target of the first relationship and the source of the second relationship. The synchronous relationships between resource groups 92, 94 and 96 are defined to allow the relationship to be created in either direction (as denoted by the dashed arrows for the reverse direction). Each of the volumes associated with resource groups 92, 94, and 96 are intended to be managed by user accounts with a user resource scope attribute G2*/* as defined by the policies shown below for each resource group.

For each of the policies defined by the scope attributes relating to copy services relationships, the following may be observed. As one of ordinary skill in the art will appreciate, the following characteristics may be implemented or changed according to a particular situation. First, relationships invoked by a host/client cannot exceed boundaries defined by one or more policies. The policies control what relationships, if any, that may be created for the set of storage resources (again such as logical volumes) associated with a given resource policy. Hosts/users may be limited to create relationships on primary/source resources in which they have access.

Further, defined policies may support cascaded relationships since the policies may specify both source and target storage resources. The policies supported by the scope attributes previously described allow 1:1, 1:M, M:1, and M:M relationships using, for example, wild card characters in specified source and target resource scope attributes. In addition, the assignment of resource group labels to resource groups should be consistent within a given installation such that for instance, a given resource scope or resource group label can be used across all storage subsystems. Also, policy capabilities may be arbitrarily expanded by adding new attributes to the resource group definition. And finally, the CS Global Resource Scope acts to limit any new copy services attributes being defined to at least some maximum scope such that the addition of new policy attributes for copy services does not introduce unexpected opportunities to escape beyond the scope specified in the CS global resource scope. In fact, the new attributes can be assigned a default value which is outside a resource scope syntax (e.g. %) that is used to indicate that the value of the attribute should be considered to be the value specified for the Global CS Global Resource Scope.

Figure 5:
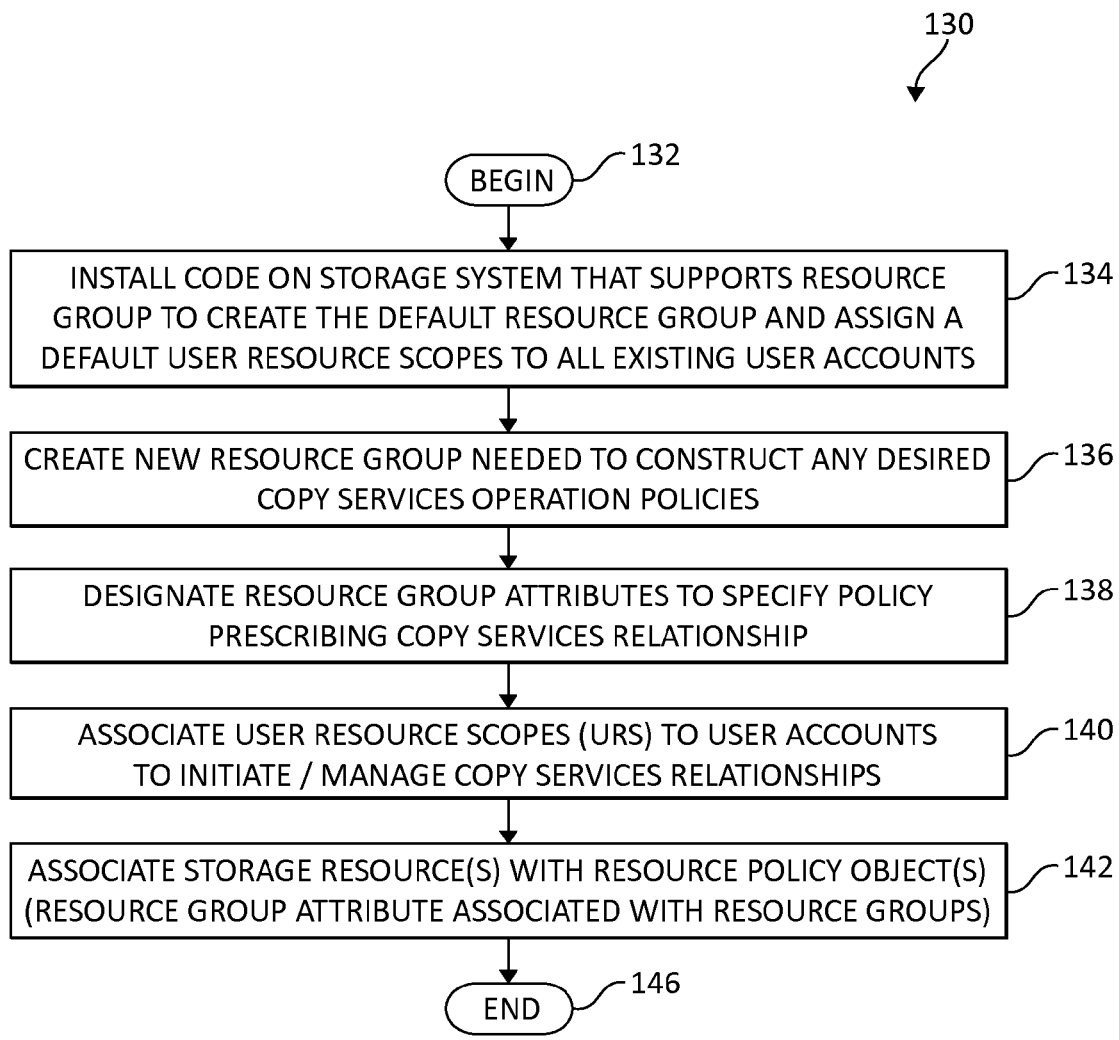
FIG. 5 is an additional flow diagram continuing the exemplary replication relation management first depicted in FIG. 3.
Figure 6:
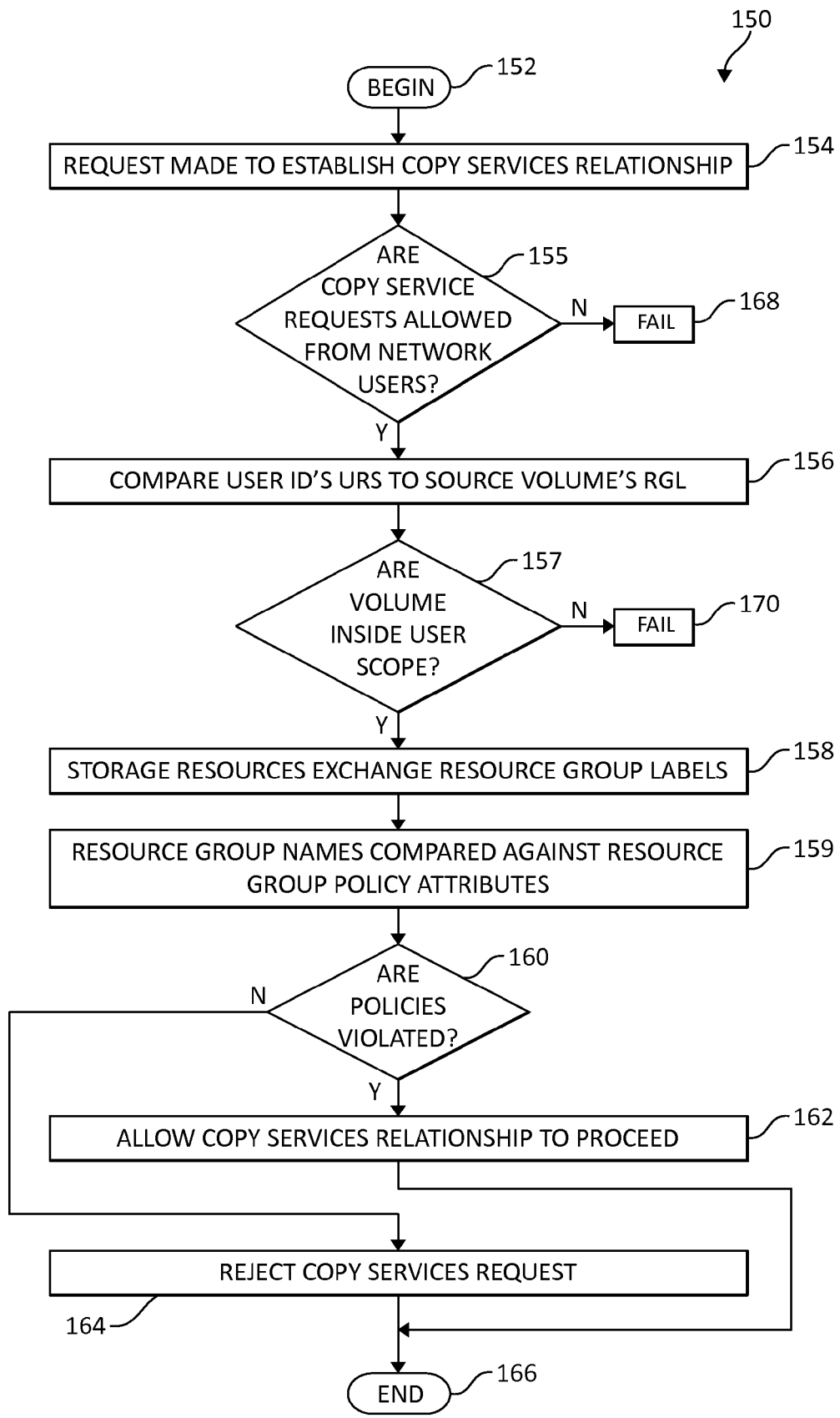
FIG. 6 is a flow chart diagram illustrating an exemplary method for implementing mechanisms for prescribing copy services relationships between storage resources organized into resource groups according to one embodiment of the present invention.

Turning now to FIG. 5, an exemplary method 130 for implementing aspects of the present invention is illustrated in flow chart diagram format. FIG. 6, later following, illustrates an exemplary mode of operation 150 of the functionality depicted in FIG. 5. As one of ordinary skill in the art will appreciate, various steps in the methods 130 and 150 may be implemented in differing ways to suit a particular application. In addition, the described methods may be implemented by various means, such as hardware, software, firmware, or a combination thereof operational on or otherwise associated with the computing storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning first to FIG. 5, method 130 begins (step 132). In step 134, code supporting resources groups is installed on an existing storage subsystem, causing the association of existing storage resources with a default resource group object, and the associating of existing user accounts with a default resource scope. Since the default resource groups and default user resource scopes result in policies that reflect the behavior of the storage subsystem prior to the installation of the resource group code, the code installation is non-disruptive and normal operation continues without any additional actions by the customer.

Should the customer wish to exploit the capabilities of resource groups to enforce specific policies, in step 136, new resource groups can be configured and, in step 138, the desired policies specified by set the correct values in the policy attributes of the volume group. Subsequently, in step 140, user accounts responsible for managing storage resources that will be associated with the new resource groups are assigned an appropriate user resource scope so that they the have access to the new resource groups. By default, the users maintain access to the default resource group so that their processing of existing resources is not disrupted by the assignment to the new user resource scope. Then in step 142, the storage resources that are to be subject to the policies in the new resource groups are moved into the new resources by updating their resource group attribute. At this point, the process ends at step 146, with the appropriate users have access to the storage resources in the new resource groups and those storage resources being subject to the policies in the new resource group.

FIG. 6, following, illustrates an exemplary method 150 of operation of policy enforcement for a copy services relationship of one embodiment of the present invention. Method 150 begins (step 152) by a user account whose user resource scope allows its access to a volume, or hosts with access to a volume, requesting establishment of a particular copy services relationship (step 154). The method then checks and determines if there are any copy service requests allowed from the network users (step 155). If copy requests from the network are not allowed, the request fails (step 168). The method then compares the user ID's user resource scope to the source volume's resource group label (step 156). The method checks to see if a volume is inside the user's scope (step 157) and if not the request fails (step 170). Pursuant to the request, the respective storage resources exchange their associated resource group's resource group labels as previously described (step 158). The resource group labels for each resource are compared against the existing resource group policy attribute or attributes (step 159). If the resource scope attributes in the resource group associated with this copy relationship match the resource group label received from the partner of the relationship and any other resource group policies relating this copy relationship are satisfied (step 160), the copy services relationship is allowed to proceed (step 162). Alternatively, access is denied (step 164). The method then ends (step 166).

In one embodiment, if the user ID is requesting a copy services, there may be three checking steps; first, a check to see if the copy services request are enabled from the network attachment interface (a failure would cause a rejection), second, a check to see if the source volume RGL is within the scope of the user ID's URS (a failure would cause a rejection), and third, a check for two volumes being paired to verify the allowability for the two volumes being paired to be in a relationship.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method of prescribing copy services relationships for storage resources in a computing environment by a processor device, comprising:

organizing the storage resources into a plurality of resource groups that are each uniquely identified by a resource group label, each of the storage resources having at least one of a plurality of resource group attributes associating a storage resource object with the plurality of resource groups and associating at least one policy via the at least one of the plurality of resource group attributes in the plurality of resource groups with the storage resources;

defining one of the at least one of the plurality of resource group attributes to specify the at least one policy prescribing the copy services relationships between the storage resources associated with the plurality of resource groups; and utilizing, by the at least one policy prescribing the copy services relationships, a resource group label attribute of the resource group to identify at least one of the plurality of resource groups within a storage subsystem of the computing environment, wherein the resource group label attribute is used in conjunction with the at least one of the plurality of resource group attributes in one of the plurality of resource groups and in one of a plurality of user ID accounts, and performing at least one of:

defining, by the at least one of the plurality of resource group attributes, pattern adapted to be compared to each of a set of resource group labels such that the resource group labels may be determined to perform one of matching and not matching the pattern, and considering the at least one of the plurality of resource groups to be included within the scope of the resource scope attribute for purposes of making a policy decision to perform one of allowing and disallowing copy services operations:

wherein the copy services relationships between the storage resources associated with the plurality of resource groups and the storage resources that are a partner of the copy services relationships are assigned the one of the at least one of the plurality of resource group attributes in a manner dependent on a copy services request, wherein pursuant to a request to establish the copy services relationships between the two storage resources:

each of the two storage resources exchange the resource group label corresponding to which of the plurality of resource groups the two storage resources are assigned, and each of the two storage resources validate the request and the resource group labels of the opposing storage resources against the one of the at least one of the plurality of resource group attributes defining a copy relationship policy in the storage resources associated with selected ones of the plurality of resource groups to determine if the copy services relationships may proceed.

2. The method of claim 1, further including, for each of a plurality of available users of the storage resources having a user resource scope attribute for allowing access to the storage resources in at least one of the plurality of resource groups, defining the user resource scope attribute to delineate an authority of each of the plurality of available users to perform at least one of initiation and management of the copy services operations on an accessible storage resource, wherein the authority of each of the plurality of available users to access the storage resources is determined, which of the plurality of storage resources that the copy services operation is acting upon being in that of the plurality of resource groups having resource group labels that are within a scope of the user resource scope attribute.

3. The method of claim 1, further including defining through the one of the at least one of the plurality of resource group attributes, one of an authority for one of a host and a user attachment interface type in communication with at least one of the storage resources to perform at least one of initiation and management of the copy services operations on a storage resource accessible to the host.

4. The method of claim 1, further including defining, the one of the at least one of the plurality of resource group attributes, a requirement for a portion of the volume address of both a source volume and a target volume of a requested copy services relationships to be identical, wherein the portion of the volume address is one of a high order bit portion specifying a logical subsystem associated with the portion of the volume address and a low order bit portion that identifies the portion of the volume address within one of a logical subsystem.

5. The method of claim 1, further including:

adapting the plurality of resource groups to contain a resource group policy attribute containing a resource scope value that is used to validate resource group labels of an opposing volume resource grouping, performing by the resource scope value one of:
   precluding all the resource group labels,
   allowing all the resource group labels, and
   allowing at least one of the resource group labels by a pattern matching algorithm, and defining the resource group label attribute and the at least one of the plurality of resource group attributes, and further defining a schema for the at least one of the plurality of resource group attributes and the resource group label attribute, thereby giving the resource scope value authority to perform the at least one of initiation and management of at least one of the copy services relationships on an accessible resource such that the scope of access is greater than those of a plurality of resource scope values that are lower in a hierarchy of the at least one of the copy services relationships.

6. The method of claim 1, wherein at least one of a plurality of group policy attributes is prescribed by a copy services global resource scope that limits both a source and a target scope of the copy services relationships of any type to a specified resource scope, wherein a resource group policy is prescribed by a source resource scope that limits a source volume, and a target resource scope that limits a target volume that may participate in the copy services relationships of a specified type with the source and the target volumes in the plurality of resource groups.

* * * * *